(12) United States Patent
Walker

(10) Patent No.: US 6,490,409 B1
(45) Date of Patent: *Dec. 3, 2002

(54) SYSTEM AND METHOD FOR MAKING A PERSONAL PHOTOGRAPHIC COLLECTION

(75) Inventor: Stephen S. Walker, Marlborough, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/197,866

(22) Filed: Nov. 23, 1998

Related U.S. Application Data

(63) Continuation-in-part of application No. 08/748,895, filed on Nov. 14, 1996.
(60) Provisional application No. 60/028,031, filed on Oct. 8, 1996.

(51) Int. Cl.$^7$ ............................ H04N 5/225; H04N 7/04
(52) U.S. Cl. ........................................ 386/117; 386/107
(58) Field of Search .................................. 386/117, 118, 386/46, 38, 4, 52, 64, 107; 348/143, 157, 158, 159, 207, 155; 360/27, 69; H04N 5/225, 7/04

(56) References Cited

U.S. PATENT DOCUMENTS

| 5,333,061 A | | 7/1994 | Nakashima et al. ........... 386/46 |
| 5,655,053 A | * | 8/1997 | Renie |
| 5,872,887 A | * | 2/1999 | Walker |

* cited by examiner

*Primary Examiner*—Robert Chevalier
(74) *Attorney, Agent, or Firm*—Leonard Charles Suchyta; James K. Weixel

(57) ABSTRACT

A personal photographic collection system involving activities of a customer at an amusement park, which includes personal images captured by a plurality of cameras, environ images separately captured and interleaved between the personal segments, and text. The organization of certain images of the personal photographic collection is determined by a customer who registers identification and information data prior to activating the cameras. Upon completion of the image capturing, the personal photographic images, the text and environ images are assembled, processed, and duplicated for delivery to the subscriber. The environ images are selected to display weather conditions existing at the time of capturing the personal photographic images.

7 Claims, 6 Drawing Sheets

SYSTEM AND METHOD FOR MAKING A PERSONAL PHOTOGRAPHIC COLLECTION

This application is a continuation-in-part application of Ser. No. 08/748,895 filed Nov. 14, 1996, and claims the benefit of Provisional application No. 60/028,031, filed Oct. 18, 1996 which is incorporated by reference herein.

BACKGROUND OF THE INVENTION

The present invention relates to a method and apparatus for capturing and gathering personal photographic images that take place at different times and at diverse geographic locations.

With the advent of the camcorder and VCR, the making of home video movies has replaced to a great extent, the taking of still photographs of events or activities that one wishes to remember. However, if traveling with friends or family, one person, usually the host or parent, not only has extra baggage to carry in the form of a camera, batteries and supplies, but he or she spends a great amount of time taking movies of the other members of the family, and the various attractions that the group visited. This, of course, detracts from the pleasure of the event for the person operating the camcorder, in that a great part of the activities of interest are seen through the viewfinder of the camcorder. Also, when visiting tourist attractions, with the camcorder exposed and ready to capture a photo opportunity, there is an increased risk of damage and theft for the camcorder. Additionally, the video cameraman of the group seldom has the opportunity of being included in scenes of the movies. Finally, the movie itself, although treasured for its remembrance value, in most instances does not reach a level approaching professionalism, because all scenes are usually shot at the same angle with the camera being the same distance from the ground. Also, an unsteady camcorder, too fast panning, poor focus, and poor lighting detract from the final product.

With a still image camera, the same type of inconvenience results. Namely, one of the parties being absent from a majority of the pictures, a constant imposition upon strangers to take pictures of the group, or a threat of loss or theft of the photographic equipment. In light of the foregoing, there is a need for an improved personal photo gathering system and method that overcomes the disadvantages of taking your own photographs while visiting a particular activity.

SUMMARY OF THE INVENTION

Accordingly, the present invention is directed to a system and method for capturing and gathering personal photographic images to substantially obviate one or more of the problems due to limitations of the related art. Although the present invention has a wide range of applications, it is particularly suitable for amusement or theme parks having many different attractions, and will be described in that connection.

Additional features of the invention will be set forth in the description which follows, and in part will be apparent from the description, or may be learned by practice of the invention. The objectives of the invention will be realized and attained by the product and the apparatus and method for making the product particularly pointed out in the written description and claims hereof as well as the appended drawings.

To achieve these features and in accordance with the purpose of the invention, as embodied and broadly described, systems consistent with the invention gather a collection of personal photographic images on a recording medium, the collection having a plurality of personal photographic images, each including a customer in a field of view, a plurality of environ images, each including a field of view lacking the customer, and a plurality of text images, each including text in a field of view. Such systems include: a registration unit responsive to inputs of a customer to store distinctive data, said distinctive data including customer identification and data for selecting the plurality of environ and text segments; a photographic image collection subsystem including a plurality of cameras and customer detectors, each of the plurality of cameras positioned geographically spaced from one another and oriented to capture, when activated, one of the plurality of personal images, each of the plurality of customer detectors being associated with one of the plurality of cameras and responsive to the distinctive data to generate an activation signal and a customer identification signal; an environ image storage module storing a plurality of environ images; a text generator; a personal storage module; a master controller governed by the registration module to store one of the plurality of personal photographic images along with customer identification into the personal storage module in response to the activation and identification signal; an assembly and processing module responsive to the master controller to assemble stored environ images, stored personal images, and generated text in accordance with the activities of the customer subsequent to the entry of information in the registration unit; and a personal production unit for permanently recording the plurality of personal photographic images on the recording medium.

In still another aspect, a method of producing a plurality of personal photographic image collections concomitantly, wherein each of the personal photographic image collections include a plurality of personal photographic images, a plurality of environ images, and text. The method comprising the steps of: storing in a registration unit the identity of a plurality of individual customers together with text and environ images of separately recorded fields of view selected by each of the plurality of individual customers; triggering concomitantly a plurality of cameras to capture images of the plurality of individual customers at geographically diverse locations; transmitting each of the captured images of the plurality of individual customers to a personal storage unit to store personal photographic images of a plurality of different customers; repeating the steps of triggering and transmitting to store a plurality of personal photographic images of the same individual customers and different individual customers; selecting environ segments displaying weather conditions corresponding to weather conditions existing at the time of recording associated personal segments; interleaving text and selected environ images between the plurality of personal segments, having the same identification data, to form for each customer a personal photographic collection having assembled personal, environ and text images upon completion of recording of personal images of one identified customer; and duplicating concomitantly on each of a plurality of recording mediums the assembled interleaved personal images of respective individual customer to provide a still image collection to each of the plurality of individual customers.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of this specification, illustrate one embodiment of the invention and together with the description serve to explain the principles of the invention.

DESCRIPTION OF THE PREFERRED EMBODIMENT

Figure 1:
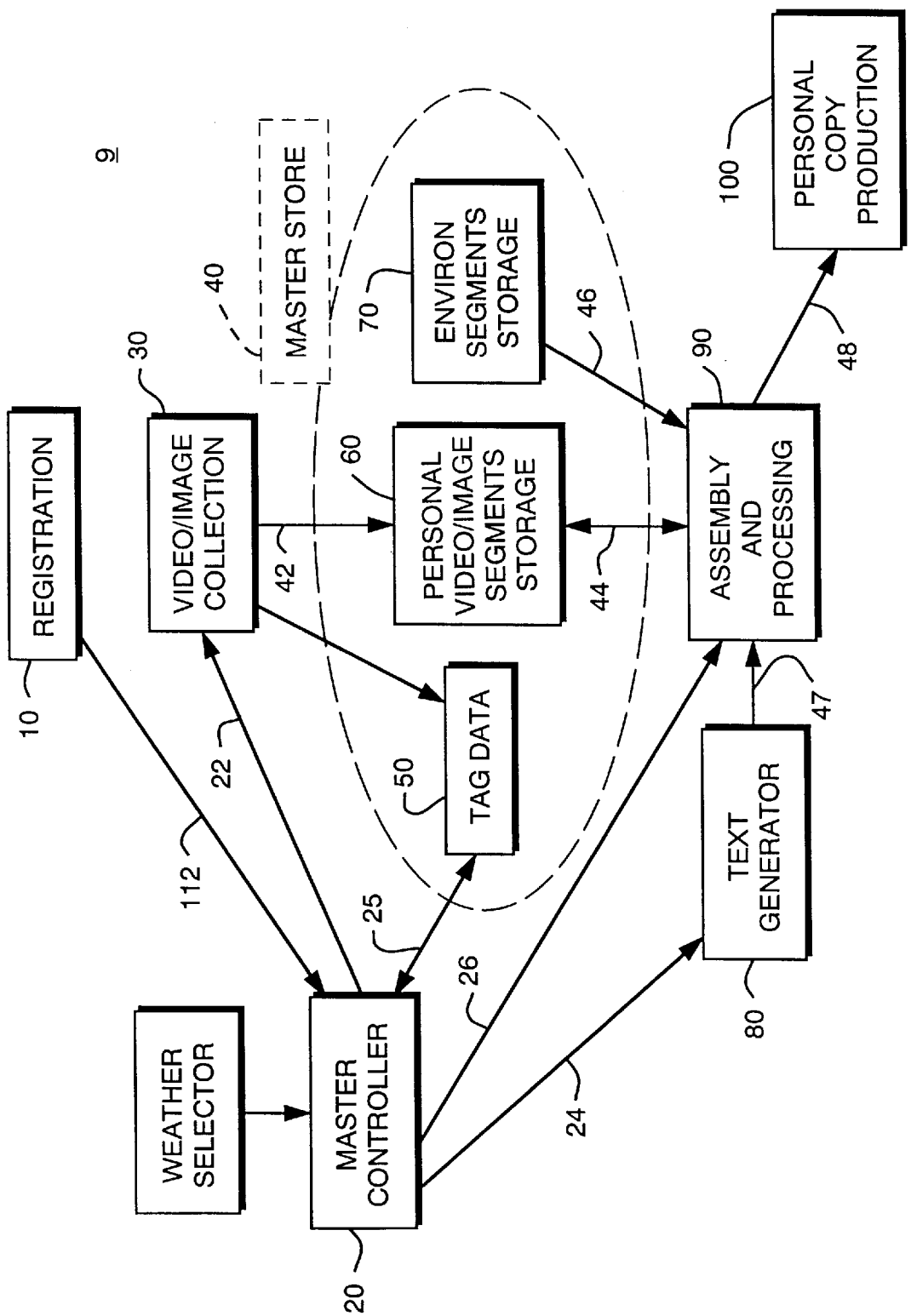
FIG. 1 is a block diagram of a video/image system of the present invention illustrating the flow of video, image, and data signals.

Reference will now be made in detail to the present preferred embodiment of the invention, an example of which is illustrated in the accompanying drawings. The exemplary embodiment of the apparatus for making the personal video or photographic image collection is illustrated in FIG. 1, and is designated generally by reference numeral 9. The term video is used throughout this document, for convenience of expression; however, such terms are also intended to include accompanying audio. Further, while the present preferred embodiment describes the production of a video tape, it may be used to gather still images and store a collection of the images optionally with associated audio on a photo compact disk (CD) or similar medium. Therefore, the term "image" is meant to define a still photographic image and is used throughout the specification to this effect.

System 9 includes a registration subsystem 10 for inputting information relating to customers, weather selector 11 for inputting weather conditions, a master controller 20, a video/image collection subsystem 30, a storage subsystem 40, which includes a tag data storage unit 50, a personal video/image storage unit 60, and an environ storage unit 70. A text generator 80, an assembly and processing subsystem 90, and personal copy production apparatus 100 complete the system.

Registration subsystem 10 includes well known components that activate customer tags 130 (see FIG. 2) and associate the tag with the particular customer, and the date and times the tag is valid. In addition, registration subsystem 10 provides the system with special information, such as the content for a custom title and text, specific environ segments, and the inclusion of a custom credit section to complete the video or image collection. The environ segments may include, for each weather condition, the arrival (or departure) of an airplane of a selected airline at a local airport, the parking lot of the amusement park, the hotel at which the users are staying, general views of the various attractions, typical travelogue type scenes of the general area, and anything else that would add interest and professionalism to a personal video or collection of photographic images. Registration subsystem 10 may also include billing information for the customer.

Master controller 20 controls the operation of system 9 by appropriate hardware and software from registration through assembly and processing. It receives data from registration subsystem 10 over line 12 and transmits and receives over line 25 tag or card data relating to the identity of the customers, the desired text over line 24, and any other special requests that system 9 is capable of implementing. Also, master controller 20 transmits data over line 22 to video/image collection subsystem 30 to enable the collection of video or still photographic images in the proper time slots, and storing of the personal video or images. Additionally, master controller 20 transmits data over line 24 to text generator 80 for insertion of customized text in the video or within a captured photographic image; and transmits data over line 26 to assembly and processing unit 90 relating to the identity of the environ segments to be included in a particular video or collection of captured images.

Figure 2:
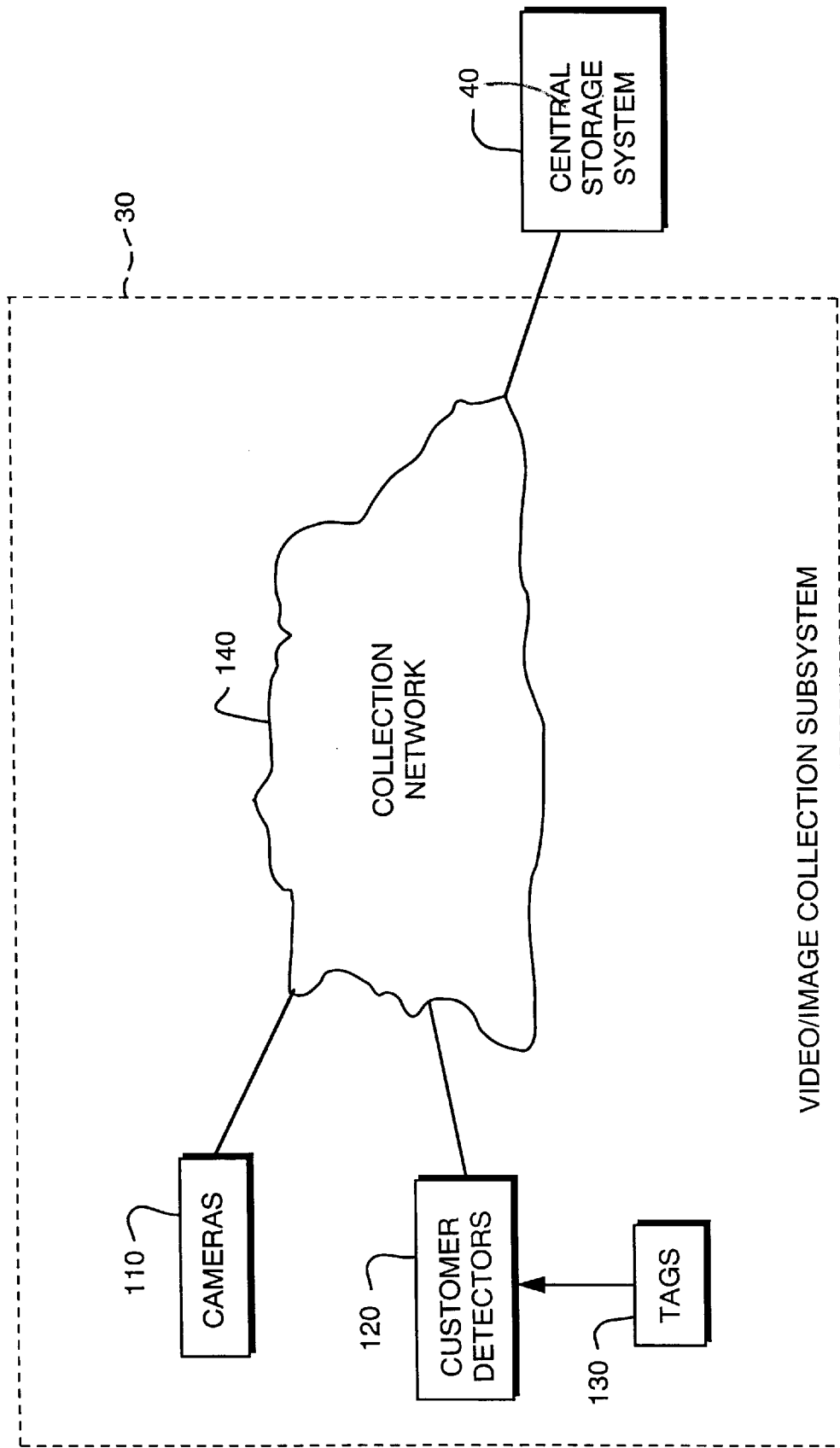
FIG. 2 is a block diagram of the video/image collection subsystem of the system of FIG. 1.

Video/Image collection subsystem 30, details of which are illustrated in FIG. 2, includes a plurality of cameras 110, customer detectors 120 for detecting tags 130, and a collection network 140. For example, in an amusement park configuration, cameras 110 may be located throughout the park at strategic locations. Some of the cameras may be stationary and oriented to photograph a defined area. Other cameras may be mounted to follow a certain path when triggered. For example, a video camera may be positioned to focus on a roller coaster as it approaches the camera or it may follow the roller coaster during one or more descents. In an alternative embodiment, digital still image cameras could replace or supplement the various video cameras. In an alternate embodiment, digital cameras may be used to allow capturing of both video and still images.

For example, there may be a camera or cameras mounted above each Ferris wheel passenger compartment, a midget auto racetrack location, and at strategic locations to photograph a myriad of other activities and attractions one would expect to find at a large amusement park. Each of these cameras would preferably be installed and oriented to provide a field of view that would be out of reach of an individual standing at floor or ground level and provide a segment or photograph that could not be obtained by an amateur cameraman without extensive equipment and props.

When a customer is identified as being on a ride by the response of customer detector 120 to a tag or card 130, the corresponding camera 110 is triggered to transmit video to personal storage module 60 of central storage system 40 via collection network 140. As an alternative, each one of the cameras 110 may run continuously over network 140 with central storage system 40 being triggered by tag 130 and detector 120 to capture the video delivered over collection network 140. Further, the still image cameras would capture the photographic images and deliver them over collection network 140.

Customer detectors 120 may be of any well-known type, such as the type used to validate credit cards, or dispense money, or gasoline, for example. Where a card or tag 130 with a magnetic stripe is swiped or inserted and removed as a customer gets on a ride or enters an attraction. This data then logically links the customer and the particular attraction or car together. As the car passes certain points in a camera's view, the car identity triggers the video/image collection which is correlated with the identity of the customer in tag data storage 50. Also, passive or active RF tags may be used of the type generally used for tracking livestock or warehouse inventory. With this approach the proximity of a tag 130 and detector 120 would trigger the video or photographic image capturing event.

Collection network 140 is the infrastructure used to transmit the data, audio/video, or still picture image signals to central data storage subsystem 40. This network may use any number of well known technologies including fiber optics, coaxial cable, copper wire, or wireless transmission, for example.

Central storage subsystem 40, which is the repository for the various segments of audio/video or photographic images necessary to complete the production of the personal video or photographic image collection for an individual customer, may be a computer with sufficient data storage to store the individual personal video or images over line 42 when captured by the cameras. Tag data storage unit 50 of central storage unit 40 receives the data from an individual tag 130 and the corresponding detector 120 via collection network 140. The data from tag data storage unit 50 is accurately aligned with each associated segment of the personal video or images transmitted by the different cameras 110 at diverse locations. The separately recorded environ segments, which include high production value shots of attractions and various views, as previously described, are stored in environ segment storage unit 70 and transmitted when ready for final assembly and processing by component 90.

Assembly and processing module or subsystem 90 receives audio/video and image signals from personal video/image storage 60 over line 44, environ segment storage 70 over line 46, and text generator 80 over line 47 at times and in a sequence as controlled by data signals from the master controller 20 over line 26. Typically, a custom title, which was entered into system 9 by registration subsystem 10, is created by the text generator 80, after which the environ segment of arrival from environ segment storage unit 70 is added. Then, depending on the instructions from master controller 20, as determined by the behavior of the customer in the park, the personal video or images from storage unit 60 are interleaved with environ segments from storage unit 70 and text from text generator 80, which is followed by personalized credits at the end thereof.

The assembled and processed segments are transmitted to a personal production subsystem 100 over line 48 from which the customers copy of the personal video or photo CD is delivered. The duplication subsystem is typically a bank of VCRs and disc recorders that are used to produce the deliverable copy. Each of the VCRs or disc recorders receive audio/video or image signals from the storage units 60 and 70, and text generator 80 in the sequence as controlled by the master controller 20.

Figure 3:
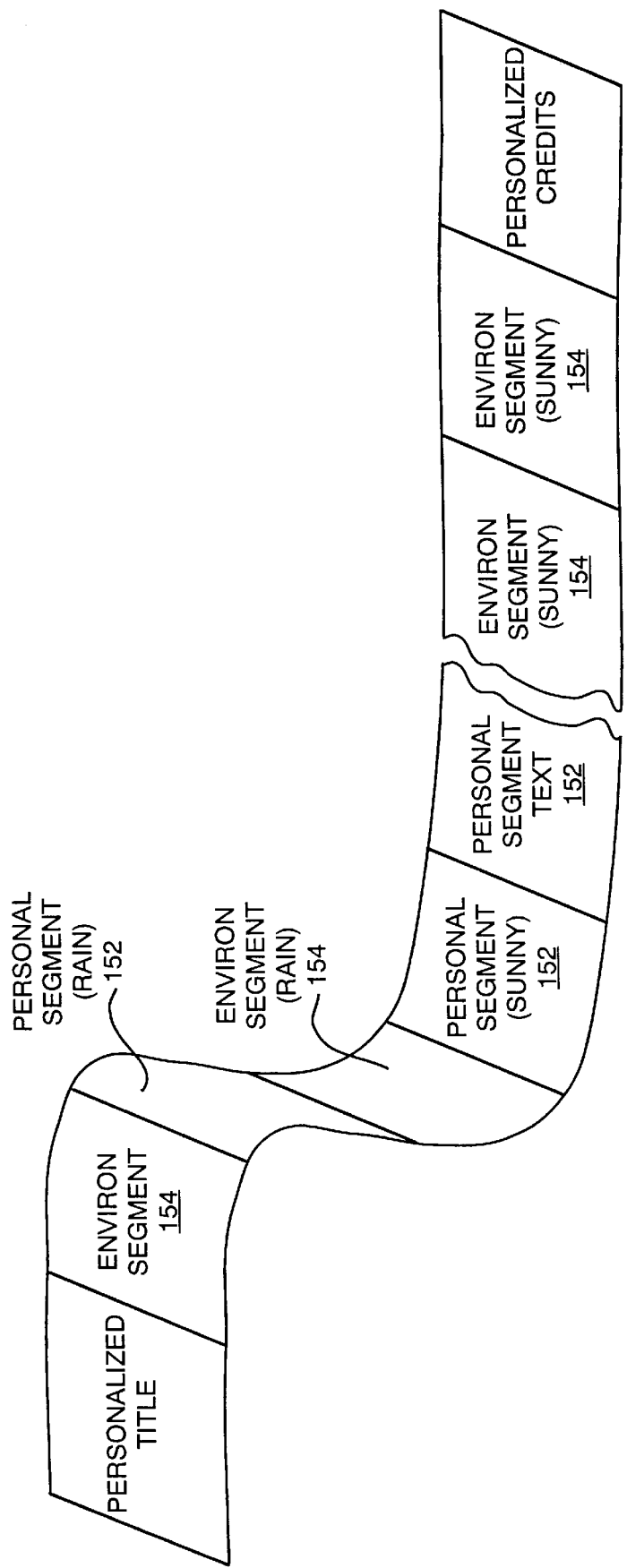
FIG. 3 is a schematic diagram illustrating a recording medium with sets of personal video/images in accordance with the present invention.

Referring to FIG. 3, the above described system produces a recording medium 150, which may be a tape or disc, for example, which is configured to have a personal video with a plurality of personal video segments 152. Each of the personal video segments 152 are recorded by a different camera positioned at diverse geographic locations to record a different field of view, such as a wide-angle field of view. Each of the personal video segments 152 were recorded one at a time in response to an input by the customer. Additionally, in all of these different fields of view the customer is engaged in an activity or observing an attraction related to the particular field of view. The recording medium has a plurality of environ segments 154 interleaved between selected ones of the plurality of personal video segments 152. Each of these environ segments 154 were recorded prior to the recording of any of the plurality of personal video segments 152. In addition, none of the environ segments 154 include any of the individuals included in the personal video segments 152. Finally, the medium includes a plurality of text segments, which are associated with selected ones of the personal video segments, and also include text, such as the title 158 of the personal video or photographic image collection, descriptions 156 during the video, and credits 160 at the end thereof. Such text being determined by at least one of the individuals in the personal video segments 152. The personal type, environ type, and text of the video segments are contiguous on the recording medium to provide a single continuous production 150 commencing with one of the text segments.

Figure 4:
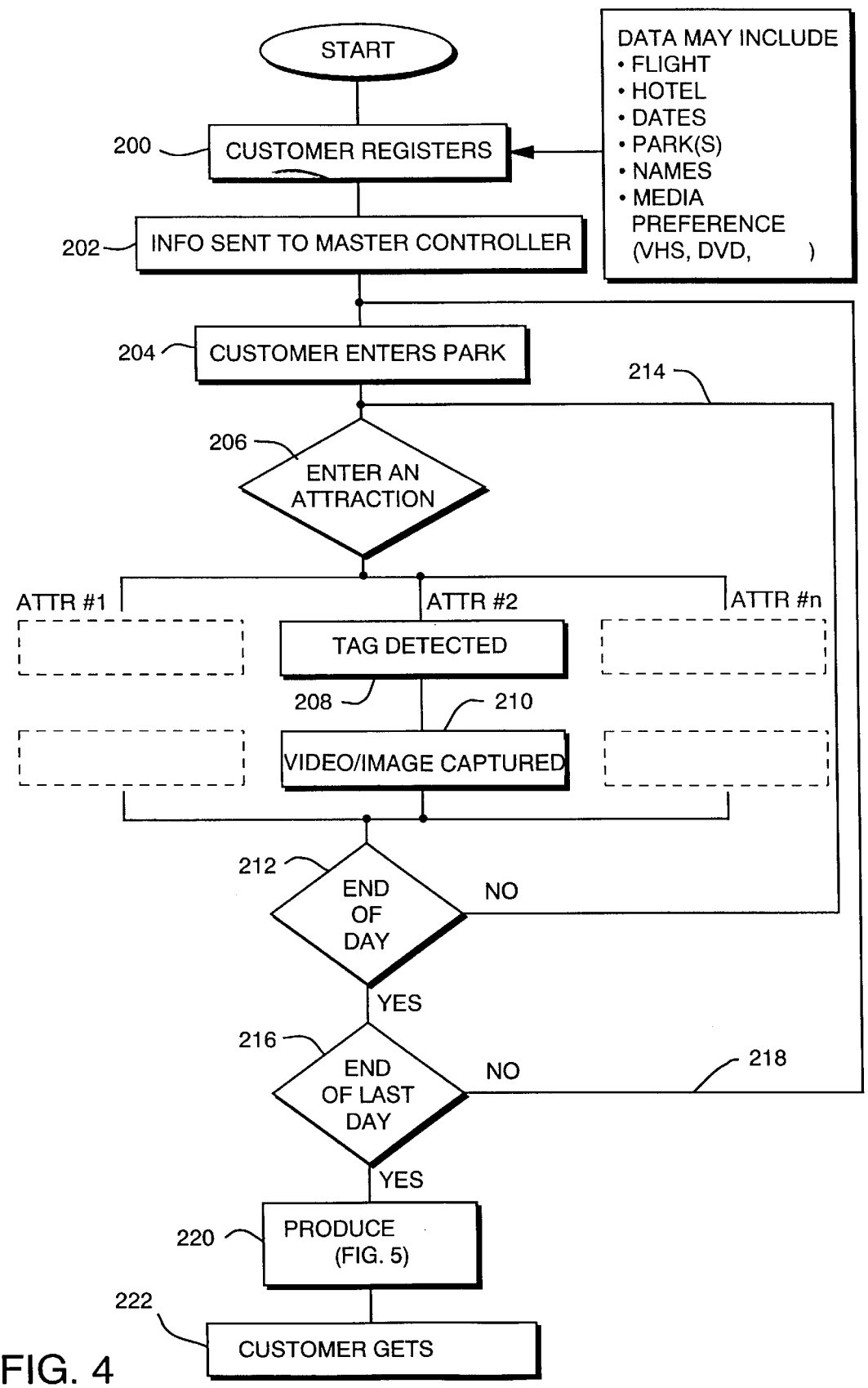
FIG. 4 is a flow chart illustrating the operation of the system in producing a video or photographic image collection in accordance with the invention.
Figure 5:
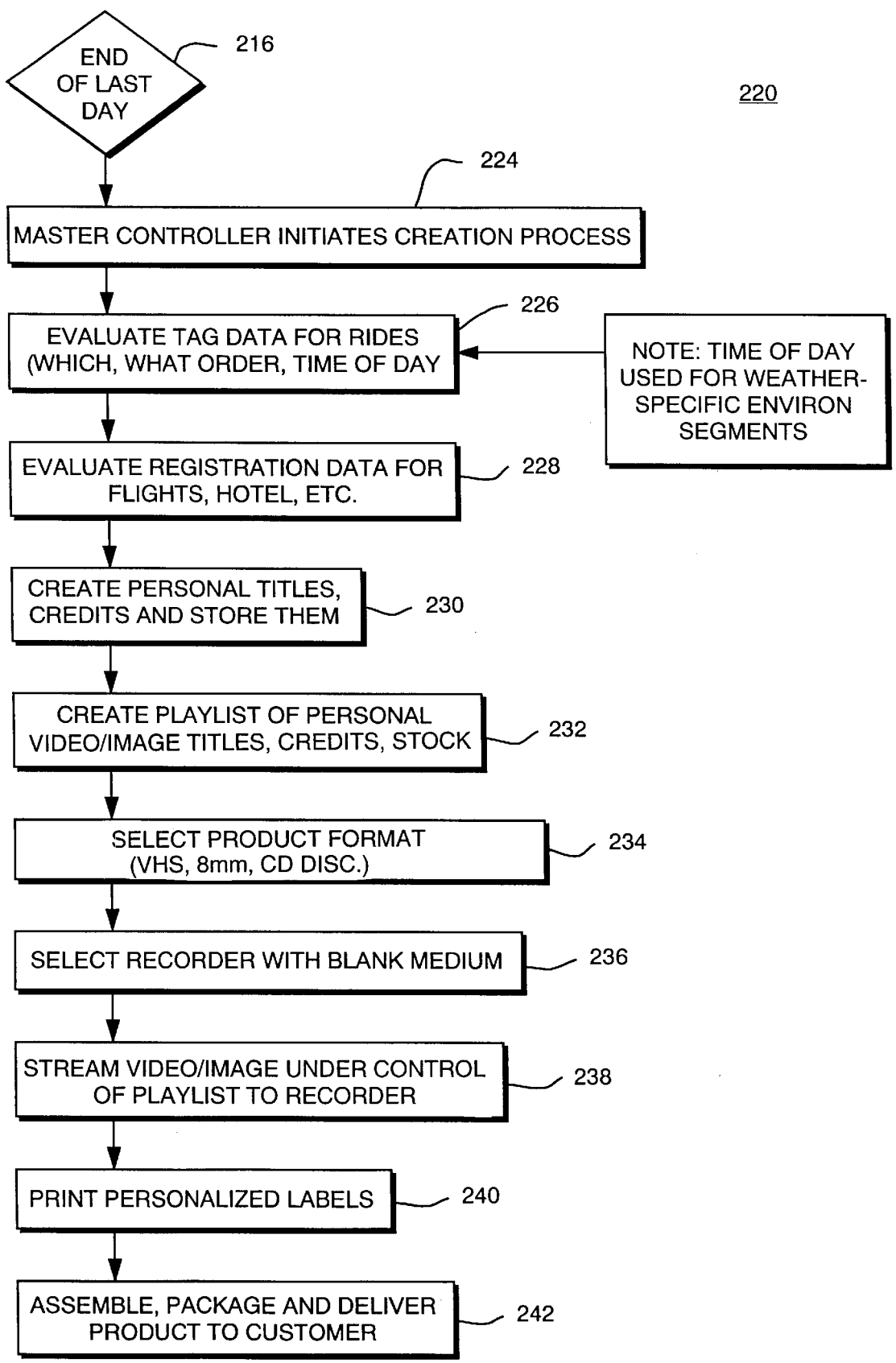
FIG. 5 is a flow chart illustrating the sub steps in the step of producing the tape or photographic image collection illustrated in FIG. 4.

In operation, and referring to the flow charts of FIGS. 4 and 5, a method of producing a personal video or collection of photographic images, which includes personal segments having fields of view that include individual customers, fields of view that lack any of the customers and recorded or captured separately from the personal segments, and fields of view that include text, first include entering an storing in registration unit 10 personal data as indicated at block 200, such as the particular flight number for arrival and departure, the hotel at which the customer is staying, the dates involved, the name of the park or parks, the names of the customer and members of his party, the time period during which such registration is active, for determining, for example, environ sequences for insertion between the personal sequences, and text including a desired personal title and personal credits listing.

At the time of registration, the customer may select environ segments to follow the title, and other default environ segments to be interleaved among the personal segments, or may select certain stock segments related to the attraction being recorded when activating a particular camera. Also, the fee for producing the personal video or image collection can be charged to the customer's credit card at the time of registration if there is a minimum fee or single fixed price, or both at the time of registration, and when activating a particular camera if the fee is increased. In accordance with the number of personal sequences or images in the production. The information entered in the register is then sent to the master controller as indicated at block 202.

The customer and his party may now enjoy the park and its attractions at 204. Assuming the customer wishes to ride the Ferris wheel, for example, at step 206, he or she inserts the previously activated card in the associated customer detector 120, at step 208 and the video or photographic image is captured. Alternatively, the customer may simply pass by the customer detector 120 that would sense an radio frequency signal associated with the card. Activation of the Ferris wheel may start the camera, or if the camera is continually running, trigger the storage unit 60 to capture the sequence of images along with the identification. When the time for each personal segment expires, or upon the occurrence of an event such as the stopping of the Ferris wheel, the camera or storage of the event ceases operation.

At the completion of the capturing of the segment, master controller 20 checks the time of day at 212. If it is not the end of the day, system 9 is ready to capture the next attraction selected by the customer as indicated by line 214. The above operation may be repeated for as many attractions as the customer wishes. If the answer is yes, master controller 20 checks to determine whether or not it is the end of the last day at step 216. If the answer is no, the customer may continue to have captured the various attraction on the medium over line 218 as indicated. If system 9 detects that the time is the end of the last day or time which was stored in the system on arrival, system 9 produces the tape or photo CD as indicated at block 220 after which the customer can receive the completed video or disk of the visit as indicated at block 222. During operation of the camera, the images are stored in real time in storage unit 60.

Referring to FIG. 5, in response to the indication that the time has expired at block 216, master controller 20 initiates the creation of the video or image collection at block 224, which instructions may be implemented in software, hardware, or combinations of hardware or software. Master controller 20 evaluates the tag data at block 226 to identify the rides and attractions selected for video by the customer, and in what order, including the actual day and time the camera was active for the particular attraction. Next, as indicated at 228, master controller 20 evaluates the registration data to determine the identity of the flights and hotel entered during registration. Then, at step 230, the personal titles and credits are created and stored.

The performance of steps 226, 228, and 230 do not necessarily occur in the sequence described. One of the important features of the present invention is the plurality of separately recorded environ segments that conform to the weather at any particular day, and time of that day in order to match the weather conditions of each personal video segment or image with its associated environ segment. The master controller uses the time information to match up a particular personal video segment with an environ segment to provide an authentic environment to the video or image collection. For example, if it were raining hard in the morning, but sunny in the afternoon, the master controller should select environ segments that illustrate rain for the rides and activities that took place in the morning and sunny environ segments for afternoon activities. This would also apply to weather conditions for showing arrival flight and hotel check-in. From this information, a list of personal video segments or images, environ segments, and credits is created at 232.

After creating the playlist, the product format is selected; that is, whether the final product is to be a VHS tape, eight millimeter, or photo disc, for example, as shown at block 234. Next, a particular recorder, which has the appropriate blank medium is selected at step 236. The video/audio segments or images under control of the playlist are then streamed or downloaded to the selected recorder as shown at block 238. Upon completion of the recording, a personalized label is affixed to the recording or collection of images at 240. Finally, at 242 the recording or collection is assembled and packaged for delivery to the customer.

Figure 6:
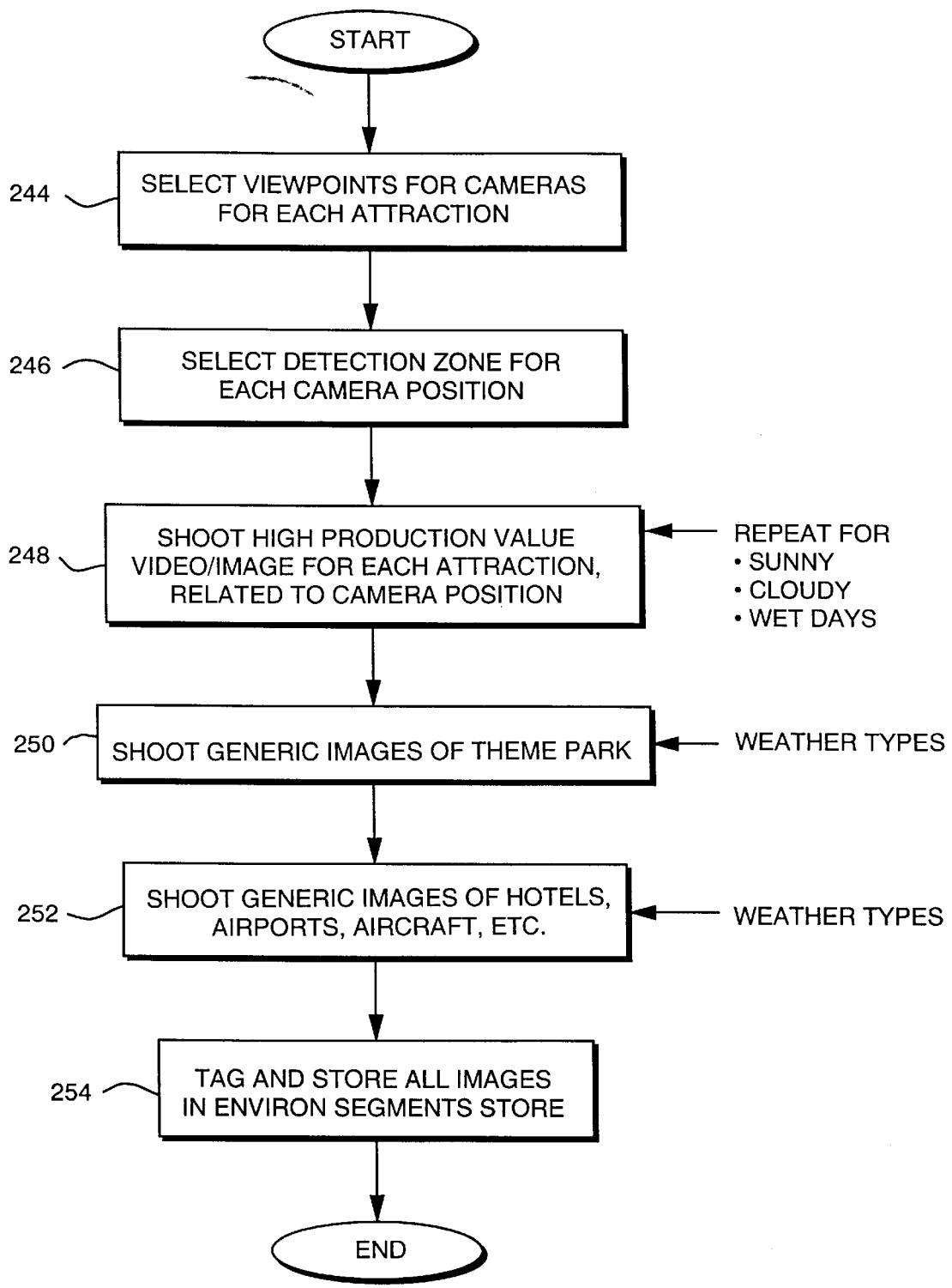
FIG. 6 is a flow chart illustrating the steps in producing separately captured environ segments or images.

In preparation for the production of the personalized video or image collection, and referring to FIG. 6, the system operator selects viewpoints for cameras at each attraction as indicated at block 244, and positions the camera to select a detection zone at 246. These detection zones correspond to the fields of view for each of the personal video segments or images. For each attraction, the system operator records or captures a high production value video or still photograph associated with each attraction related to the camera position as indicated by block 248 to provide the environ segments. These segments are created for various weather conditions, such as sunny, cloudy, or wet days as previously described. Additionally, the operation records or captures generic scenes of the park or general area, as shown at block 250, to create general environ images, which also are repeated for various weather conditions.

Also, as previously mentioned the operator records or captures generic video or images segments of local airports, aircraft of different airlines and types, and hotels under various weather conditions to create environ segments that preface and follow the customers visits to the various attractions, as indicated at block 252. Each of the environ segments are identified and classified according to weather conditions. Thus, the operator can enter in the master controller, each change of weather condition, and the time of such change, so that the proper environ segments will be associated with the appropriate personal video segments or images. Once all of the environ segments have been recorded, the operator need only input to the master controller the time of each change of weather, which will result in an authentic personal video segments or images that have associated therewith environ segments displaying similar weather conditions.

It will be apparent to those skilled in the art that various modifications and variations can be made in the apparatus, method and production of the present invention without departing from the spirit or scope of the invention. Thus, it is intended that the present invention cover the modifications and variations of this invention provided they come within the scope of the appended claims and their equivalents. For example, if the video segments are recorded digitally, still images may be extracted from the captured personal segments to produce the still image collection. Select images, i.e., those providing the best images of the customer may be stored on the photo CD. This feature would allow the customer to have a video and a photo image collection from the same visit to the park.

What is claimed is:

1. A still image recording medium configured to comprise:
    a plurality of personal photographic images recorded at spaced locations on the recording medium, each said personal plurality of photographic images having been captured by a different camera of a plurality of cameras to have a different field of view, each said different field of view including an individual common to all of the plurality of photographic images engaged in an activity related to the field of view;
    a plurality of environ images interleaved between selected ones of the plurality of personal photographic images, said plurality of environ images having fields of view captured prior to the capturing of any one of the plurality of personal photographic images, said plurality of environ images selected to display weather conditions similar to weather conditions existing at the time of capturing the photographic images, said fields of view of the plurality of environ images lacking any individual included in the fields of view of the plurality of personal photographic images; and
    a plurality of text segments associated with selected ones of the plurality of personal photographic images, having text determined by the individual common to the fields of view of the plurality of personal photographic images.

2. The recording medium according to claim 1, wherein each of the fields of view of the plurality of personal photographic images include an attraction in an amusement park; and each of the environ images has a field of view associated with a respective attraction displaying weather conditions existing at the time of capturing an associated personal photographic image.

3. A system for gathering a collection of personal photographic images on a recording medium, said collection having a plurality of personal photographic images, each including a customer in a field of view, a plurality of environ images, each including a field of view lacking the customer, and a plurality of text segments, each including text in a field of view, said system comprising:
    a registration unit responsive to inputs of a customer to store distinctive data, said distinctive data including customer identification and data for selecting the plurality of environ and text segments;

a photographic image collection subsystem including a plurality of cameras and customer detectors, each of the plurality of cameras positioned geographically spaced from one another and oriented to capture, when activated, one of the plurality of personal images, each of the plurality of customer detectors being associated with one of the plurality of cameras and responsive to the distinctive data to generate an activation signal and a customer identification signal;

an environ image storage module storing a plurality of environ images;

a text generator;

a personal storage module;

a master controller governed by the registration module to store one of the plurality of personal photographic images along with customer identification into the personal storage module in response to the activation and identification signal;

an assembly and processing module responsive to the master controller to assemble stored environ images, stored personal images, and generated text in accordance with the activities of the customer subsequent to the entry of information in the registration unit; and a personal production unit for permanently recording the plurality of personal photographic images on the recording medium.

4. The system of claim 3, wherein the environ image storage module comprises a plurality of sets of environ images, each set displaying a different one of a plurality of weather conditions and further comprises:

weather selection means for selecting one of said set of environ images in accordance with weather conditions existing at the time of said selection.

5. A method of producing a plurality of personal photographic image collections concomitantly, wherein each of the personal photographic image collections include a plurality of personal photographic images, a plurality of environ images, and text, said method comprising the steps of:

storing in a registration unit the identity of a plurality of individual customers together with text and environ images of separately recorded fields of view selected by each of the plurality of individual customers;

triggering concomitantly a plurality of cameras to capture images of the plurality of individual customers at geographically diverse locations;

transmitting each of the captured images of the plurality of individual customers to a personal storage unit to store personal photographic images of a plurality of different customers;

repeating the steps of triggering and transmitting to store a plurality of personal photographic images of the same individual customers and different individual customers;

selecting environ segments displaying weather conditions corresponding to weather conditions existing at the time of recording associated personal segments;

interleaving text and selected environ images between the plurality of personal segments, having the same identification data, to form for each customer a personal photographic collection having assembled personal, environ and text images upon completion of recording of personal images of one identified customer; and duplicating concomitantly on each of a plurality of recording mediums the assembled interleaved personal images of respective individual customer to provide a photographic image collection to each of the plurality of individual customers.

6. The method of claim 5, further including the steps of:

placing a camera at each of a plurality of geographically diverse locations and oriented to capture a selected field of view; and positioning identification detectors at locations adjacent each of a selected fields of view to indicate activation by a particular customer.

7. A method of producing a plurality of still photographic images collections from a video based recording system used to produce a personal video, wherein the personal photographic video includes a plurality of personal video segments, a plurality of environ segment, and text, said method comprising the steps of:

storing in a registration unit the identity of a plurality of individual subscribers together with text and environ segments of prerecorded video fields of view selected by each of the plurality of individual customers;

triggering concomitantly a plurality of the video cameras to record the activities of the plurality of individual customers at each of the geographically diverse locations;

transmitting each of the recorded activities of the plurality of individual customers to a personal storage unit to store personal video segments of a plurality of different customers;

repeating the steps of triggering and transmitting to store a plurality of personal segments of the same individual subscribers and different individual customers;

selecting a plurality of personal photographic still images from the plurality personal segments of one identified customer;

duplicating concomitantly the plurality of selected personal photographic still images of the one identified customer on a of photo compact disc, the selected still images to provide a personal still image collection for the one identified customer.

* * * * *